US 8,465,642 B2

Jun. 18, 2013

(12) United States Patent
Kazem

(10) Patent No.: US 8,465,642 B2
(45) Date of Patent: Jun. 18, 2013

(54) METHOD AND APPARATUS FOR SEPARATING IMPURITIES FROM A LIQUID STREAM BY ELECTRICALLY GENERATED GAS BUBBLES

(75) Inventor: Bijan Kazem, Alpharetta, GA (US)

(73) Assignee: Hydro Dynamics, Inc., Rome, GA (US)

( * ) Notice: Subject to any disclaimer, the term of this patent is extended or adjusted under 35 U.S.C. 154(b) by 1163 days.

(21) Appl. No.: 12/113,443

(22) Filed: May 1, 2008

(65) Prior Publication Data

US 2008/0272056 A1 Nov. 6, 2008

Related U.S. Application Data

(60) Provisional application No. 60/927,558, filed on May 4, 2007.

(51) Int. Cl.
*C02F 1/14* (2006.01)
*B01F 3/04* (2006.01)

(52) U.S. Cl.
USPC .............. 210/221.2; 261/84; 261/92; 261/93; 204/212

(58) Field of Classification Search
USPC ............... 261/84, 92, 93; 204/212; 210/221.2
See application file for complete search history.

(56) References Cited

U.S. PATENT DOCUMENTS

| 3,198,191 | A |   | 8/1965  | Wyszomirski |         |
|-----------|---|---|---------|-------------|---------|
| 3,663,117 | A | * | 5/1972  | Warren      | 415/116 |
| 3,873,414 | A |   | 3/1975  | Rocher et al. |       |
| 3,948,489 | A |   | 4/1976  | Sawyer      |         |
| 4,075,248 | A |   | 2/1978  | Marshall et al. |     |
| 4,273,075 | A |   | 6/1981  | Freihage    |         |
| 4,357,931 | A |   | 11/1982 | Wolpert et al. |      |
| 4,781,151 | A |   | 11/1988 | Wolpert, Jr. et al. | |
| 5,082,526 | A |   | 1/1992  | Dorris      |         |
| 5,141,328 | A |   | 8/1992  | Dilley      |         |
| 5,188,090 | A |   | 2/1993  | Griggs      |         |
| 5,285,443 | A | * | 2/1994  | Patsiokas et al. | 370/280 |
| 5,385,298 | A |   | 1/1995  | Griggs      |         |
| 5,490,727 | A |   | 2/1996  | Poschl      |         |
| 5,552,133 | A |   | 9/1996  | Lambert et al. |      |

(Continued)

FOREIGN PATENT DOCUMENTS

| CA | 2115383 | 11/1999 |
|----|---------|---------|
| DE | 2323751 | 11/1974 |

(Continued)

*Primary Examiner* — Thomas M Lithgow
(74) *Attorney, Agent, or Firm* — Womble Carlyle Sandridge & Rice, LLP

(57) ABSTRACT

A method and apparatus for separating impurities from a liquid stream includes a feed tank for containing an untreated liquid, a mixer for generating and mixing bubbles throughout the wastewater, and a settling tank for allowing the wastewater to settle for removal of impurities through dissolved gas floatation. The mixer includes a housing and a rotor rotatably mounted within the housing. The rotor is electrically isolated and the peripheral wall of the housing is electrically isolated and the rotor preferably has bores formed in its peripheral surface to produce cavitation to aid in mixing of fluid within the mixer. A power supply is coupled to establish a relatively positive electrical charge on the rotor and a relatively negative electrical charge on the wall of the housing. The charge causes electrolysis to occur within the fluid, which forms small low surface tension gas bubbles on the rotor and housing wall. These bubbles detach and are mixed with the fluid, where they can attach to and separate impurities through dissolved gas floatation.

15 Claims, 2 Drawing Sheets

U.S. PATENT DOCUMENTS

| | | |
|---|---|---|
| 5,782,556 A | 7/1998 | Chu |
| 5,810,052 A | 9/1998 | Kozyuk |
| 5,937,906 A | 8/1999 | Kozyuk |
| 5,957,122 A | 9/1999 | Griggs |
| 6,074,554 A * | 6/2000 | Ray et al. ............... 210/194 |
| 6,365,555 B1 | 4/2002 | Moser et al. |
| 6,386,751 B1 | 5/2002 | Wootan et al. |
| 6,627,784 B2 * | 9/2003 | Hudson et al. ........... 588/320 |
| 7,771,582 B2 * | 8/2010 | Kazem ..................... 205/687 |
| 2002/0077373 A1* | 6/2002 | Hudson et al. ........... 516/98 |
| 2004/0232006 A1* | 11/2004 | Kazem ..................... 205/687 |
| 2006/0126428 A1* | 6/2006 | Hudson et al. ........... 366/101 |

FOREIGN PATENT DOCUMENTS

| | | |
|---|---|---|
| DE | 33 27 137 A1 | 2/1984 |
| EP | 0 680 779 A1 | 11/1995 |
| EP | 06 10 914 A1 | 9/1997 |
| JP | 55002491 | 1/1979 |
| JP | 60008391 | 1/1985 |
| JP | 62213895 | 3/1986 |
| WO | WO 94/11096 A1 | 5/1994 |

* cited by examiner

METHOD AND APPARATUS FOR SEPARATING IMPURITIES FROM A LIQUID STREAM BY ELECTRICALLY GENERATED GAS BUBBLES

RELATED APPLICATIONS

This claims the benefit of the filing date of U.S. provisional patent application No. 60/927,558 filed May 4, 2007.

BACKGROUND

Separating impurities from a liquid stream is a difficult and necessary task in many industries such as, for instance, in the oil industry where a produced liquid stream must be treated to remove dissolved impurities and metals. Conventional techniques for treating such a liquid stream have included the use of chemical additives to bring the impurities together and filtration and/or dissolved air floatation to separate and remove the impurities from the liquid. However, these prior techniques have their own set of inherent problems. For instance, the added chemicals can result in large quantities of chemical sludge, which itself must be treated before being disposed of in the environment. Filtering techniques can result in filter clogging, low separation rates, and low overall efficiencies.

Dissolved air floatation is a technique wherein bubbles are introduced into and mixed thoroughly in the wastewater and these bubbles attach themselves to particles of impurities. As the resulting mixture rests in, for instance, a holding tank, the bubbles float to the surface carrying the impurities with them. The cleaned wastewater can then be extracted from the bottom of the holding tank while the impurities are skimmed from the surface of the water in the tank. Dissolved air floatation, while promising, comes with its own set of inherent problems. For example, it is difficult to produce bubbles that are sufficiently small to attach themselves to very small contaminant particles, and so the process can be inefficient for such particles. Perhaps more salient, however, is the fact that the pressure that necessarily is used to pump the air into the fluid results in bubbles with internal pressures higher than that of the surrounding liquid. This, in turn, produces bubbles with relatively high surface tension, which resists attachment of the bubbles to contaminant particles. For at least these reasons, dissolved air floatation has heretofore enjoyed limited success.

Accordingly, there is a long felt and continuing need for a technique and apparatus for separating impurities from a stream of wastewater using dissolved air floatation that is more efficient and more effective than prior art techniques. The technique and apparatus should produce in the wastewater bubbles of arbitrarily small size to attach to very small particles of impurities and with the lowest possible surface tension to enhance the attachment process. The present invention seeks to fill this need.

SUMMARY

In one preferred aspect, a mixing device includes a housing defining a cylindrical interior space within which a cylindrical rotor is rotatably disposed. A fluid inlet and a fluid outlet communicate with the interior space to allow a stream of fluid to flow therethrough. In this preferred aspect, the rotor is formed about its peripheral surface with an array of irregularities such as radially extending bores. As discussed in U.S. Pat. No. 6,627,784, cavitation produced in the bores when the rotor is rotated within a fluid in the housing causes extremely effective and efficient mixing in the spaces between the rotor and the housing wall.

The rotor of the mixing device is electrically insulated and isolated from the peripheral outer wall of the housing and the rotor and housing wall are formed of and/or plated with an appropriate metal or alloy. A DC power supply supplies a positive electrical charge to the rotor and a negative electrical charge to the outer wall of the housing. As a flow of wastewater moves through the space between the rotor and the wall of the housing, gas bubbles begin to form on the rotor and the peripheral wall of the housing through the process of electrolysis. More specifically, oxygen bubbles begin to form on the positively charged rotor of the mixer while hydrogen bubbles begin to form on the negatively charged peripheral wall of the housing. At the beginning, the bubbles of oxygen are sub-microscopic in size, theoretically beginning with a single molecule, and they grow with time. At some point, when the bubbles reach a certain size, they detach from the rotating rotor and are mixed into the flow of fluid moving through the mixer. Hydrogen bubbles on the wall of the housing also detach and are mixed. The size at which the bubbles detach can be controlled by controlling the rate of flow of the fluid, the rotation rate of the rotor, and other factors. Thus, bubbles of an arbitrarily small size can be released and mixed into the fluid flow.

Perhaps more importantly, the bubbles that form and grow on the surface of the rotor and housing do so at approximately the same pressure as the surrounding fluid. Accordingly, the bubbles of hydrogen and oxygen produced by electrolysis have the lowest possible surface tension, typically significantly lower than bubbles injected into the fluid flow under pressure. As a result, the arbitrarily small bubbles attach themselves much more readily to contaminates within the fluid. The ultimate result is smaller bubbles with lower surface tension mixing with the fluid within the mixing device. Once the bubbles are thoroughly mixed in the fluid, the fluid is pumped to a holding tank where dissolved gas floatation begins to separate the impurities from the fluid. It has been demonstrated that this separation process proceeds at higher rates than with traditional dissolved air floatation processes wherein air is pumped into the liquid and mixed, and further that the resulting cleaned wastewater is cleaner.

A better understanding will be gained upon review of the detailed description set forth below taken in conjunction with the accompanying drawing figures, which are briefly described as follows.

DETAILED DESCRIPTION

Figure 1:
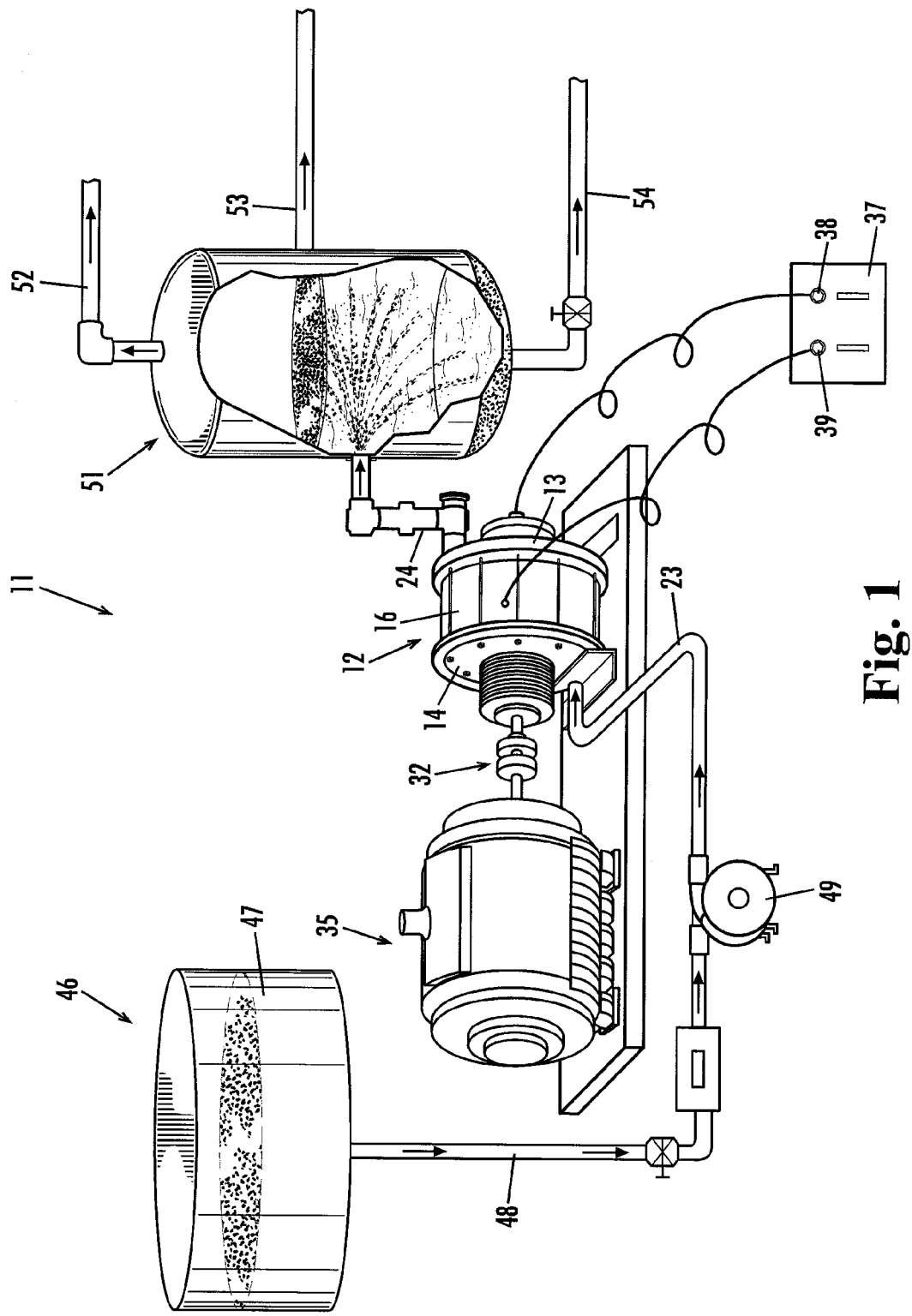
FIG. 1 is a perspective view of an system for separating impurities from a liquid stream using electrically generated bubbles that embodies principles of the invention in one preferred form.

Referring now in more detail to the drawing figures, wherein like reference numerals refer to like parts throughout the several views, FIG. 1 illustrates part of a system 11 for separating impurities from a liquid stream according to principles of the invention. In one aspect, the liquid from which impurities are to be separated is oil well wastewater; however, contaminated water from virtually any source may be treated using the present invention. The system 1 includes a feed tank 46 that holds wastewater 47 to be treated. The wastewater 47 is drawn from the tank 46 by a feed pump 49, which draws the wastewater through a feed conduit 48 and delivers it through an inlet conduit 23 to a mixer 12. The mixer 12 is described in detail below, but generally includes a cylindrical housing formed by end walls 13 and 14 and a cylindrical peripheral wall 16. The peripheral wall 16 is electrically isolated by appropriate insulating gaskets between the peripheral wall 16 and the end walls 13 and 14. A cylindrical rotor 26 (FIG. 2) is rotatably disposed within the housing and has a peripheral surface that is formed with an array of bores and that is spaced from the interior surface of the cylindrical peripheral wall 16 to define a gap. The rotor is coupled to an electric motor 35 through an electrically insulating coupling 32 so that the rotor 26, like the peripheral wall 16, is electrically isolated from all other components of the mixer and system.

A DC power source 37 has a positive output terminal 38 and a negative output terminal 39. The positive output terminal is electrically connected to the rotor of the mixer and the negative output terminal is electrically connected to the cylindrical outer wall of the mixer as shown. Thus, when DC voltage is applied, the rotor 26 of the mixer becomes an anode and the cylindrical peripheral wall 16 of the housing becomes a cathode, the rotor taking on a positive electrical charge relative to the charge on the wall of the housing. When contaminated water such as oil well wastewater is present in the gap between the rotor (anode) and the peripheral wall 16 of the housing (cathode) electrolysis occurs wherein water molecules are separated into their constituent elements, oxygen and hydrogen. More specifically, oxygen bubbles begin to form and collect on the surface of the positively charged and rotating rotor 26, while hydrogen bubbles begin to form and collect on the surface of the negatively charged peripheral wall 16. These gas bubbles each theoretically begins with a single hydrogen molecule ($2H_2$) or oxygen molecule ($O_2$) and grows by collecting other molecules around this seed. Furthermore, since the bubbles grow within and at substantially the same pressure as the surrounding water, the bubbles are created and grow with a surface tension that is the lowest possible for a gas bubble to exist in the liquid.

When the oxygen bubbles on the surface of the rotating rotor reach a certain size, they are detached from the rotor by the centrifugal force of the spinning rotor and by turbulence of cavitation within the bores and mixing occurring in the gap between the rotor 26 and peripheral wall 16. The size of the bubbles when they are detached can be controlled by varying the speed of rotation of the rotor and other factors. Thus, bubbles of an arbitrarily small size and lowest possible surface tension can be created and mixed thoroughly within the wastewater by controlling the rotation rate of the rotor. The ultimate result is countless very small very low surface tension bubbles of oxygen and hydrogen mixed thoroughly in the wastewater. Because of their low surface tension and small size, these bubbles begin immediately to attach very efficiently to impurities dissolved within the water such as, in the example of oil well wastewater, barium, calcium, magnesium, potassium, sodium, and strontium.

The liquid and bubble mixture then exits the device 12 through an outlet conduit 24 and is delivered to a settling tank or reservoir 51 to rest for a predetermined period of time. As the mixture rests in the tank, the small low surface tension bubbles continue to attach to dissolved impurities in the water and further, because of their buoyancy, begin to float to the surface of the liquid carrying with them the contaminates to which they have attached. This general process is known as dissolved gas floatation. As the bubbles reach the surface, they eventually pop, releasing their gas and leaving on the surface of the liquid the impurities that they carried with them, which collect into a sludge. The released gas is extracted from the settling tank through a gas outlet conduit 52 while the sludge of impurities that collects on the surface of the liquid is skimmed off through a skim outlet conduit 53. Finally, the treated water, which is far cleaner than before, is extracted from the settling tank 51 through a cleaned solution outlet 54 at the bottom of the settling tank. It has been found that, using the present invention, the separation of impurities occurs at a significantly faster rate and the resulting water is significantly cleaner than with prior art dissolved air floatation techniques using pumped-in pressurized air bubbles and various mixers. It is believed that this is because pumped-in air bubbles cannot be made arbitrarily small as in the present invention and they have relatively high surface tensions, which inhibits their ability to attach readily to impurities within the wastewater.

Figure 2:
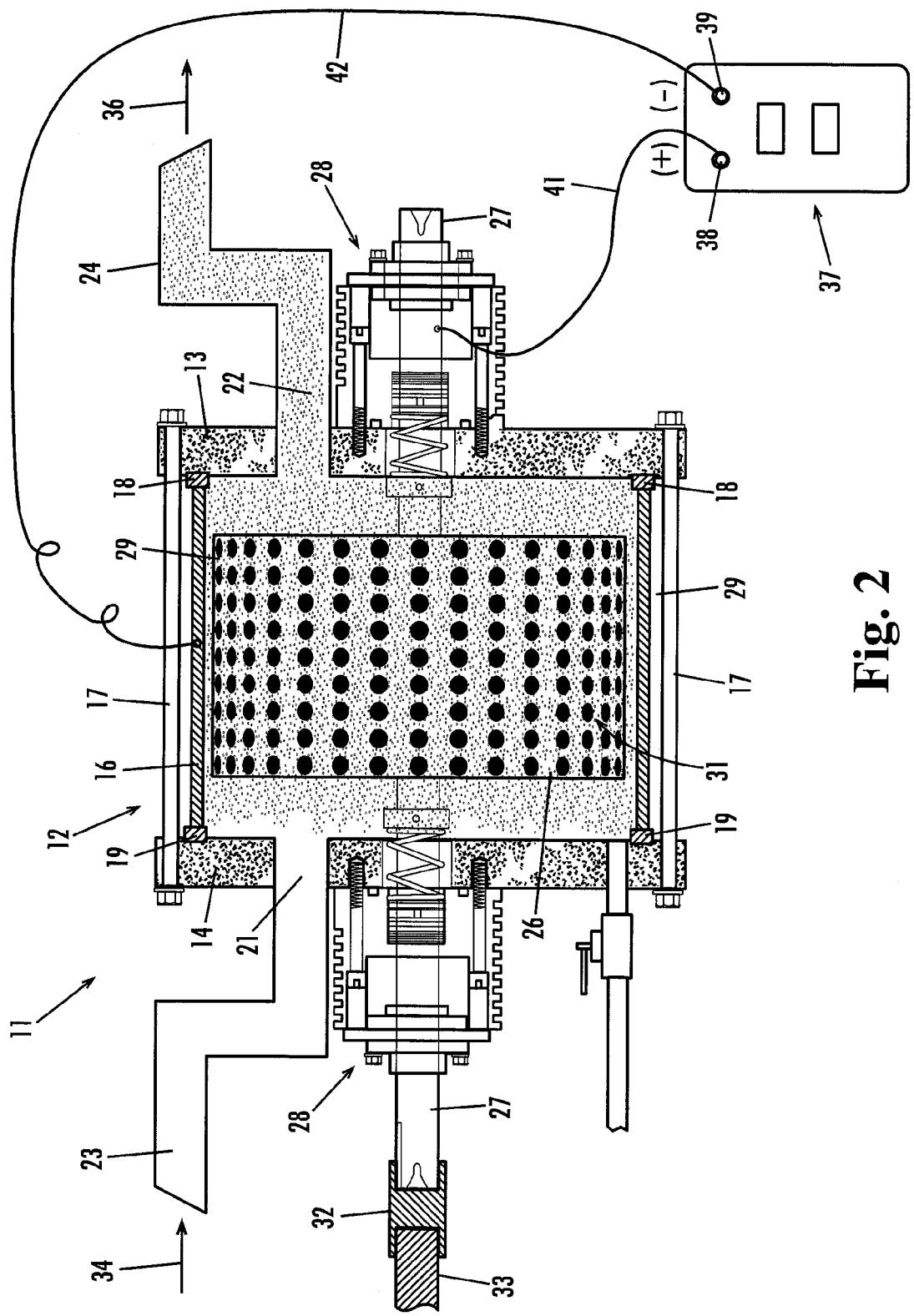
FIG. 2 is a cut-away view of one possible mixing apparatus for use in the system of FIG. 1.

FIG. 2 illustrates in more detail the mixer 12 according to a preferred embodiment of the invention. In this embodiment, the mixer is a cavitation mixer similar in most respects to that discussed in detail in my U.S. Pat. No. 6,627,784, the disclosure of which is hereby incorporated by reference. It should be understood, however, that the invention herein is not limited to such a mixer and that any mixing apparatus with surfaces that move relative to one another and that can be electrically isolated and charged might be substituted for that of the preferred embodiment. Referring to FIG. 2, the mixer 12 includes a housing formed of side plates 13 and 14 between which a cylindrical peripheral wall 16 is secured with bolts 17. The end plates and peripheral wall define a generally cylindrical interior chamber of the mixer 12 and an electrically insulating gasket 18 isolates the peripheral wall 16 electrically from all other components of the mixer. The gasket 18 might, for example, be a sheet gasket, a rubber gasket, an O-ring, or any appropriate gasket that can serve to isolate the peripheral wall electrically.

An inlet 21 communicates with the interior chamber of the housing through end plate 14 and an outlet 22 communicates with the interior chamber through end plate 13. The inlet 21 is coupled to a feed conduit 23 through which fluid is delivered to the inlet 21 and the chamber and an outlet conduit 24 communicates with the outlet 22 for drawing fluid from the interior chamber.

A cylindrical rotor 26 is rotatably mounted within the interior chamber of the mixer on a rotor shaft 27, which, in turn is journaled within appropriate bearing assemblies 28 on each end plate of the mixer. Rotation of the rotor shaft 27 causes the rotor 26 to rotate within the chamber. The rotor shaft 27 is coupled to the drive shaft 33 of electric motor 35 (FIG. 1) through an electrical isolation coupling such that the rotor 26 is electrically isolated from the motor and from the cylindrical peripheral wall 16 of the housing. The peripheral surface of the rotor 26 is spaced from the peripheral wall 16 of the housing to define a gap 29 and is provided with an array of cylindrical bores 31 that extend radially into the rotor a predetermined distance. More specifically, the bores are arranged in a plurality of axially spaced apart rows extending around the peripheral surface of the rotor and the bores of each row are separated from one another. Other arrangements of bores also are possible and contemplated by the present invention. In any event, when the rotor is rotated with fluid present in the interior chamber of the housing, cavitation is generated within the bores. This cavitation creates shock waves that project outwardly into the gap 29 and enhance mixing within the gap, as described in more detail in my incorporated U.S. Pat. No. 6,627,784.

A DC power source 37, which, in the preferred embodiment is a variable voltage DC power supply, is coupled to the mixer to create an electrical potential difference between the rotor 23 and the peripheral wall 16 of the housing. More specifically, the positive pole 38 of the DC power source is electrically coupled to rotor 31 through, for example, the rotor shaft 27 while the negative pole 39 of the power source 37 is electrically coupled to the peripheral wall of the housing. Thus, the moving rotor in the interior chamber may be said to be an anode while the stationary peripheral wall 16 of the housing may be said to be a cathode.

When contaminated water such as oil well wastewater is present in the interior chamber and the rotor and wall are charged, small bubbles begin to form on the surface of the rotor 26 and on the interior surface of the peripheral wall 16 through the process of electrolysis. More specifically, since the rotor 26 is positively charged relative to the wall 16, oxygen gas bubbles begin to form on the rotor. Conversely, since the cylindrical wall 16 is negatively charged relative to the rotor 26, hydrogen gas bubbles begin to form on the interior surface of the wall 16.

To prevent oxygen forming on the rotor from simply oxidizing the rotor surface rather than forming bubbles, the rotor preferably is not made of a metal that is subject to oxidation. For example, the rotor should not be made of aluminum, stainless steel, iron, or titanium as these metals are subject to oxidation and may prevent the formation of oxygen bubbles on the rotor. Traditionally, platinum is used for electrodes in devices for the electrolysis of water and, while this is an option for the rotor of the present invention, its expense makes it a less than optimum option. It has been found that a rotor made of titanium coated or plated with a ruthenium titanium oxide on its surfaces functions well in the present invention and represents the best mode of carrying out the invention. However any metal, alloy, oxide, or other material may be chosen for the rotor and/or its coating so long as the material is resistant to oxidation and thereby promotes the formation of oxygen bubbles on the surface of the rotor. Since hydrogen bubbles form on the surface of the cylindrical wall 16, oxidation is not a concern and the cylindrical wall 16 of the housing may be formed of an appropriate material such as, for example, stainless steel.

The oxygen and hydrogen gas bubbles begin to grow on the surfaces of the rotor and wall respectively from a submicroscopic size and theoretically from single molecules. Additional molecules attach to this seed as the electrolysis process proceeds, and the bubbles grow progressively. Importantly, these bubbles grow with the minimum surface tension possible within the fluid since, among other things, they are not created by injecting gas under pressure into the fluid. Rotation of the rotor within the housing in conjunction with the cavitation and mixing turbulance occurring within the gap 29 cause the bubbles to detach from the surfaces of the rotor and wall when they reach a certain size. The size at which the bubbles detach can be controlled through adjustment of the rotation rate of rotor, the flow rate of the fluid through the mixer, or the charge difference between the rotor and the wall, or a combination thereof. When the very low surface tension bubbles reach a predetermined, preferably very small size determined by the above parameters, they detach from their respective surfaces and mix with the fluid within the mixer, where they are uniformly distributed by the mixing action, which, in the preferred embodiment, is aided by cavitation within the bores of the rotor.

As the bubbles mix with the fluid, they begin to attach themselves to various impurities within the fluid. In the case of oil well wastewater, for example, the bubbles may attach to contaminants containing barium, calcium, magnesium, potassium, sodium, strontium, and others. Because of the very small size and minimum possible surface tension of the bubbles, this attachment is believed to occur much more efficiently than with traditional dissolved gas floatation techniques where air and/or other gasses may be pumped into the liquid under pressure as or before the liquid is subjected to mixing in a mixer. It is further believed that the small, low surface tension bubbles and their ease of attachment to contaminants is an important factor in the enhanced performance of the present invention in removing contaminants at a very rapid rate.

As shown in FIG. 1, the liquid and electrolysis-generated bubble mixture is delivered through outlet conduit 24 to settling tank 51 where the fluid is allowed to sit for a predetermined period of time. During this time, the bubbles mixed in the fluid begin to float due to their buoyancy to the surface of the fluid. As they do so, they carry the contaminants to which they have attached with them with the result that a sludge of contaminants forms on the surface of the liquid, which can be removed through the skim outlet conduit 53. At the same time, the gas from the bubbles collects in the top of the settling tank and can be withdrawn through gas outlet conduit 52. The water that is left behind exhibits contaminant concentrations that are greatly reduced to levels rivaling or better than those obtained through traditional dissolved air floatation techniques. It has further been found that the separation of contaminants from the fluid occurs at rates that are significantly better than those observed with traditional techniques. After a predetermined time sufficient to allow the floatation process to complete substantially, the cleaned wastewater can be drawn from the settling tank through cleaned solution outlet 54.

EXAMPLE

A cavitation mixer similar to that illustrated in FIG. 2 was installed. The rotor of the mixer was six inches wide and eight inches in diameter with bores formed around its exterior surface. Ten experiments were performed in which oil well wastewater was pumped through the mixer at various pressures and flow rates while the rotation rate of the rotor and the electrical charges established on the rotor and the cylindrical wall of the mixer were varied. Samples of the wastewater from the mixer were then taken, allowed to settle, and given a sample number, with the samples being subsequently tested for contaminant concentrations. These concentrations were then compared to the levels of contaminants within a control sample of wastewater, designated herein as Sample 500, that had not been treated. The following table shows the conditions of the ten experiments and the sample number assigned to treated wastewater resulting from each experiment.

| FLOW RATE (GPM) | pH | INLET TEMP (° F.) | OUTLET TEMP (° F.) | INLET PRES (psig) | OUTLET PRES (psig) | PSV (V) | PSC (A) | CYCLE (RPM) | CUR (A) | VOLT (V) | SAMP # |
|---|---|---|---|---|---|---|---|---|---|---|---|
| 4.4 | 6.8 | 72.5 | 72.9 | 12 | 12 | 3.7 | 100 | 600 | 4.4 | 93 | 500-A |
| 4.4 | 6.8 | 72.4 | 72.7 | 12 | 12 | 3.9 | 110 | 600 | 4.4 | 93 | 507-A |
| 3.01 | 6.8 | 72.5 | 72.9 | 14 | 14 | 4.0 | 110 | 600 | 4.4 | 93 | 507-B |

-continued

| FLOW RATE (GPM) | pH | INLET TEMP (° F.) | OUTLET TEMP (° F.) | INLET PRES (psig) | OUTLET PRES (psig) | PSV (V) | PSC (A) | CYCLE (RPM) | CUR (A) | VOLT (V) | SAMP # |
|---|---|---|---|---|---|---|---|---|---|---|---|
| 3 | 6.8 | 84.0 | 85.8 | 14 | 14 | 4.1 | 110 | 1200 | 4.4 | 167 | 514 |
| 3.7 | 6.8 | 87.0 | 89.2 | 11 | 11 | 3.8 | 80 | 1800 | 4.4 | 238 | 515 |
| 3.7 | 6.8 | 87.0 | 90.0 | 11 | 11 | 4.3 | 100 | 1800 | 4.9 | 238 | 516 |
| 3.7 | 6.8 | 87.2 | 91.1 | 10 | 10 | 4.6 | 110 | 1800 | 4.9 | 238 | 517 |
| 3.7 | 6.8 | 87.1 | 89.4 | 10 | 10 | 4.6 | 110 | 1200 | 4.4 | 167 | 518 |
| 3.7 | 6.8 | 87.3 | 89.4 | 10 | 10 | 4.4 | 110 | 600 | 4.4 | 93 | 519 |
| 3.7 | 6.8 | 87.2 | 89.2 | 8 | 8 | 4.2 | 110 | 300 | 6.7 | 57 | 520 |

Where:

Flow Rate is the rate of flow of wastewater through the mixer in gallons per minute.

pH is the pH of the wastewater prior to treatment indicating its acidity or alkalinity.

Inlet Temp is the temperature of the wastewater taken at the inlet of the mixer in degrees Fahrenheit.

Outlet Temp is the temperature of the wastewater taken at the outlet of the mixer in degrees Fahrenheit.

Inlet Pres is the pressure of the wastewater taken at the inlet of the mixer in pounds per square inch gauge.

Outlet Pres is the pressure of the wastewater taken at the outlet of the mixer in pounds per square inch gauge.

PSV is the voltage developed by the DC power supply and applied across the rotor and peripheral wall of the housing in volts.

PSC is the current drawn from the DC power supply during the experiment in amperes.

Cycle is the rotation rate of the rotor in revolutions per minute.

Cur is the current drawn by the electric motor in rotating the rotor in amperes.

Volt is the voltage required to operate the electric motor at the Cycle rpm and Cur.

Sample # is the sample number assigned to the cleaned wastewater resulting from the experiment.

Each sample, included untreated sample 500, was then measured by an independent laboratory to determine the level of contaminants in the sample for purposes of comparison to the contaminant level in the untreated sample 500. The table below shows the results of the independent measurements with all numbers being in parts per million of each measured contaminant.

It can be seen from these experiments that the present invention results in a significant reduction in contaminants within the wastewater. Perhaps the best results were obtained under the conditions of samples 515 and 517, indicating that the corresponding combination of parameters under which these samples were produced are nearest to optimum.

The invention has been described herein in terms of preferred embodiments and methodologies considered by the inventor to be the best mode of carrying out the invention. It will be understood by those of skill in the art, however, that various additions, deletions, and modifications of the illustrated embodiments might be made within the scope of the invention. For instance, while a cavitation mixer was used and is considered to work well, any type of mixing device wherein one member moves relative to an adjacent member and the two members are capable of being electrically charged with a potential difference relative to each other is within the scope of the invention. In other words, the invention is not limited to a cavitation mixer such as that shown and described, but can be carried out with any appropriate mixer. Other modifications, subtle and gross, might be made to the illustrated embodiments without departing from the spirit and scope of the invention as set forth in the claims.

What is claimed is:

1. A dissolved gas floatation mixer comprising:
   a housing having a wall;
   a movable member disposed in said housing and having a surface spaced from the wall of the housing;
   an array of irregularities on the surface of the movable member configured to generate cavitation in a fluid within the housing when the movable member is moved at a predetermined rate;

| SAMPLE # | BARIUM | CALCIUM | MAGNESIUM | POTASSIUM | SODIUM | STRONTIUM |
|---|---|---|---|---|---|---|
| 500 (Untreated) | 257 | 19200 | 1820 | 1010 | 58400 | 3310 |
| 500-A | 86.5 | 3880 | 314 | 170 | 13400 | 1120 |
| 507 | 187 | 15100 | 1450 | 817 | 47800 | 2600 |
| 507-A | 209 | 13400 | 1330 | 757 | 44000 | 2470 |
| 507-B | 237 | 11700 | 1140 | 684 | 40800 | 2310 |
| 514 | 39.9 | 3980 | 321 | 188 | 13800 | 1130 |
| 515 | 73.3 | 4140 | 343 | 204 | 14100 | 1110 |
| 517 | 39.6 | 4400 | 370 | 212 | 14600 | 1120 |
| 518 | 41.6 | 4550 | 376 | 222 | 15500 | 1160 |
| 519 | 50.8 | 4720 | 388 | 229 | 15200 | 1180 |
| 520 | 52.4 | 4870 | 414 | 246 | 16200 | 1230 | at least a portion of said housing being electrically isolated and at least a portion of said movable member being electrically isolated;

a motor for moving said movable member in said housing;

a source of DC power electrically coupled to said portion of said housing and said portion of said movable member to establish an electrical potential difference therebetween;

the positive pole of the source of DC power being electrically coupled to one of said portion of said housing and said portion of said movable member to form an anode thereof;

the negative pole of the source of DC power being electrically coupled to the other one of said portion of said housing and said portion of said movable member to form a cathode thereof;

at least the surface of the anode comprising a material that is resistant to oxidation to promote the formation of oxygen bubbles on the surface of the anode as a result of electrolysis when a fluid is present within the housing and DC power is supplied by the source of DC power to the anode and the cathode; and an inlet conduit and an outlet conduit coupled to said housing for delivering fluid to said housing and extracting fluid from said housing.

2. The mixer of claim 1 and wherein said housing defines a generally cylindrical interior chamber.

3. The mixer of claim 1 and wherein said movable member comprises a rotor rotatably mounted within said housing.

4. The mixer of claim 3 and wherein the irregularities comprise bores in the rotor.

5. The mixer of claim 4 and wherein said housing defines a generally cylindrical interior chamber and wherein said rotor is generally cylindrical and rotatably mounted within said interior chamber.

6. The mixer of claim 5 and wherein said DC power supply is coupled to establish on said rotor a positive electrical charge relative to said portion of said housing and at least a surface of said rotor comprises a material resistant to oxidation.

7. The mixer of claim 6 and wherein said portion of said rotor comprises an outer peripheral surface of said rotor.

8. The mixer of claim 1 wherein the material that is resistant to oxidation comprises a metal.

9. The mixer of claim 8 wherein the metal comprises titanium.

10. The mixer of claim 1 wherein the material that is resistant to oxidation comprises an oxide of a metal.

11. The mixer of claim 10 wherein the oxide of a metal comprises an oxide of titanium.

12. The mixer of claim 11 wherein the oxide of a metal comprises ruthenium titanium oxide.

13. The mixer of claim 1 wherein the material that is resistant to oxidation comprises a coating the surface of the rotor.

14. The mixer of claim 13 wherein the material that is resistant to oxidation comprises ruthenium titanium oxide.

15. The mixer of claim 14 wherein the rotor comprises titanium and the coating is on the surface of the titanium.

* * * * *